United States Patent
Lebert

(10) Patent No.: US 9,268,928 B2
(45) Date of Patent: Feb. 23, 2016

(54) SMART PEN SYSTEM TO RESTRICT ACCESS TO SECURITY SENSITIVE DEVICES WHILE CONTINUOUSLY AUTHENTICATING THE USER

(71) Applicant: International Business Machines, Armonk, NY (US)

(72) Inventor: Berthold Martin Lebert, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 14/246,133

(22) Filed: Apr. 6, 2014

(65) Prior Publication Data

US 2015/0286810 A1 Oct. 8, 2015

(51) Int. Cl.
*G06K 5/00* (2006.01)
*G06F 21/32* (2013.01)
*G06F 21/34* (2013.01)

(52) U.S. Cl.
CPC ............... *G06F 21/32* (2013.01); *G06F 21/34* (2013.01)

(58) Field of Classification Search
USPC ............................ 235/380, 382, 383; 382/124
See application file for complete search history.

(56) References Cited

U.S. PATENT DOCUMENTS

| | | | |
|---|---|---|---|
| 7,433,499 B2 | 10/2008 | Kim | |
| 7,483,552 B1* | 1/2009 | Pomerantz et al. | 382/116 |
| 7,961,917 B2 | 6/2011 | Black | |
| 8,520,905 B2 | 8/2013 | Black | |
| 2002/0095586 A1 | 7/2002 | Doyle | |
| 2005/0180618 A1* | 8/2005 | Black | 382/124 |
| 2008/0166028 A1 | 7/2008 | Turek et al. | |
| 2009/0000831 A1 | 1/2009 | Miller et al. | |
| 2011/0320352 A1 | 12/2011 | Mehew et al. | |
| 2013/0094719 A1 | 4/2013 | Haddad | |
| 2013/0278383 A1 | 10/2013 | Boshra | |
| 2013/0298224 A1 | 11/2013 | Heilpern | |
| 2013/0336549 A1 | 12/2013 | Black | |

* cited by examiner

*Primary Examiner* — Ahshik Kim
(74) *Attorney, Agent, or Firm* — David A. Mims, Jr.; Darcell Walker

(57) ABSTRACT

Continuous authentication of a user of a computing device is established to ensure security of the computing device. A smart pen fingerprint print reader identifies a user fingerprint and a determination is made to grant access to a computer device for this user. Communication with the computing device is accomplished through the smart pen. A security event is detected when the continuous user contact with the smart pen device is disrupted. In addition, user inactivity or exceeding a threshold distance between the smart pen device and the computing device may also trigger a security event. Detection of a security event will cause the screen content of the computing device to become unintelligible and the computing device becomes inoperable.

9 Claims, 7 Drawing Sheets

SMART PEN SYSTEM TO RESTRICT ACCESS TO SECURITY SENSITIVE DEVICES WHILE CONTINUOUSLY AUTHENTICATING THE USER

FIELD OF THE INVENTION

This invention relates to a method and system for authenticating and allowing access to a computing device based on a user's fingerprint. In particular, this invention relates to continuously authenticating a user and restricting access to a computing device. More particularly, this invention relates to a method and system for controlling access to a computing device using a smart pen to restrict access to security sensitive devices while continuously authenticating the user.

BACKGROUND OF THE INVENTION

In many industries employees/workers share computer devices, like smart phones or tablet computers to reduce the number of devices and thus the costs for purchasing and maintaining these devices. For example, a large store can provide a pool of devices for its sales staff. A factory can provide a set of devices for each shift. In this and other scenarios, security is a very large concern. Sales staff could forget to log out before they return the device to the pool or hand it over to a co-worker. Automatic time-out mechanisms provide some protection in that regard, but this it is not enough to allow sharing of devices in areas which much higher security requirements, like government agencies, military institutions, the banking industry, to name a few.

Even if devices are not shared with employees/workers, a device can get stolen or lost, and unauthorized people could get access to the data stored on the device or retrieve it from server connections. To prevent the unauthorized use of a device at all times the identity of the user must be established at all times and if this is not the case then the device must be inoperable. This invention addresses this problem by proposing a secure pen (Smart Pen) that is the only way to operate the device and that authenticates the current user at all times while operating the device.

There are input devices with integrated finger print readers, like keyboards and mouses. But none of them allow the authentication of the user at all times. A secure application would force a user to re-authenticate using the finger print reader over and over after a perceived inactivity. In addition these devices are used on desktop or laptop computers and are usually just some of a variety of input devices on these systems. With the Smart Pen "user activity" is maintained while the user holds the input device in a natural manner, unaware in doing so.

U.S. Pat. No. 6,728,881 to Somayajulu Karamchetty describes an authorization system uses card and signature devices to provide access to a machine. The devices include capacitance grids positioned on different surface regions of the devices to convert fingerprint images of at least two fingers into electrical signals. An images processor in the device processes the electrical signals detected from the fingerprints to produce electrical images of the user's fingerprints. The devices store fingerprint information and encrypted user identification data. An authenticating processor compares the user's fingerprints detected on the capacitance grids with authorized user's previously recorded fingerprint's and the user's name and identification data to produce an authenticating signal if there is a match of the fingerprint images. Signature storage and identification can be provided to store and authenticate the uses' electronic signature.

U.S. Patent Application publication number 20130298224A1 to Mark Heilpern describes an electronic device may include a finger sensor to sense a user's finger. The electronic device may also include a processor coupled to the finger sensor to perform multiple applications, acquire finger-matching biometric data of the user's finger from the finger sensor, and authenticate the user based upon a match between the acquired finger-matching biometric data and finger-enrollment biometric data. The processor may also start a given application, from among the applications thereof, based upon the authentication. The processor may treat the authentication as valid for a threshold time period U.S. Patent Application publication number 20080166028A1A1 to Joseph Turek describes a method and system that decreases the rejection rate in fingerprint capturing and authentication by a pressure actuated fingerprint sensing module. The biometric device for fingerprint recognition of a user comprises a fingerprint sensing module for capturing the fingerprint image of the user at a pre-specified pressure, or a pre-specified pressure range. The fingerprint sensing module comprises a fingerprint capturing module, a pressure sensing module, a sensor memory and a sensor controlling module. The fingerprint capturing module captures the fingerprint when the pressure applied by the finger reaches the pre-specified pressure, or when the applied pressure falls within the pre-specified pressure range. The pressure sensing module measures the pressure applied on the fingerprint capturing module. The sensor memory stores a pre-defined set of pressures or pressure ranges. The sensor controlling module actuates the capture of the fingerprint image at a pre-specified pressure or in a pressure range.

U.S. Patent Application publication number 20080166028A1A1 to Ronald Doyle describes a method, system, computer program product, and method of doing business by improving security of a computing device. Continuous authentication of a user of the computing device, which may be (for example) a portable or personal computing device (also known as a "pervasive computing device"), is performed. The disclosed techniques also improve the security of operations or transactions carried out with such computing devices. Biometric sensors are preferably used for obtaining identifying information from users of computing devices, and this obtained information is compared to previously-stored biometric information which identifies the legitimate owner of the device. If the information matches, then it can be assumed that this user is the device owner, and a security-sensitive transaction is allowed to proceed so long as the biometric input is uninterrupted. Otherwise, when the obtained information does not match, or when there is an interruption in the biometric input, then the device may be in the wrongful possession of an impostor. A transaction may therefore be prevented or aborted, or in other cases perhaps simply marked as suspect or not authenticated; or, it may be desirable to completely deactivate the computing device.

Although there have been several developments in technology that enhances the security of computing devices there remains a need for a smart pen system that can restrict access to security sensitive devices while continuously authenticating the user.

SUMMARY OF THE INVENTION

This present invention prevents unauthorized access to touch screen devices (Smart Phones, Tablet Computers, etc.) by proposing a secure pen (Smart Pen) which is the only way to operate the device. The person holding the pen is identified by a finger print reader which is build into the device. The finger print data is transmitted from the pen to the device. The device's security software maps this data to registered users of the device and based on the user's profile establishes access rights to the programs and data on the device or on the back end systems reachable with the device's capabilities. The device access is allowed as long as user holds the Smart Pen or does not leave the immediate premises of the device. If the security system cannot authenticate the finger print and thus the user then the access to the device is blocked.

DETAILED DESCRIPTION OF THE PRESENT INVENTION

Figure 1:
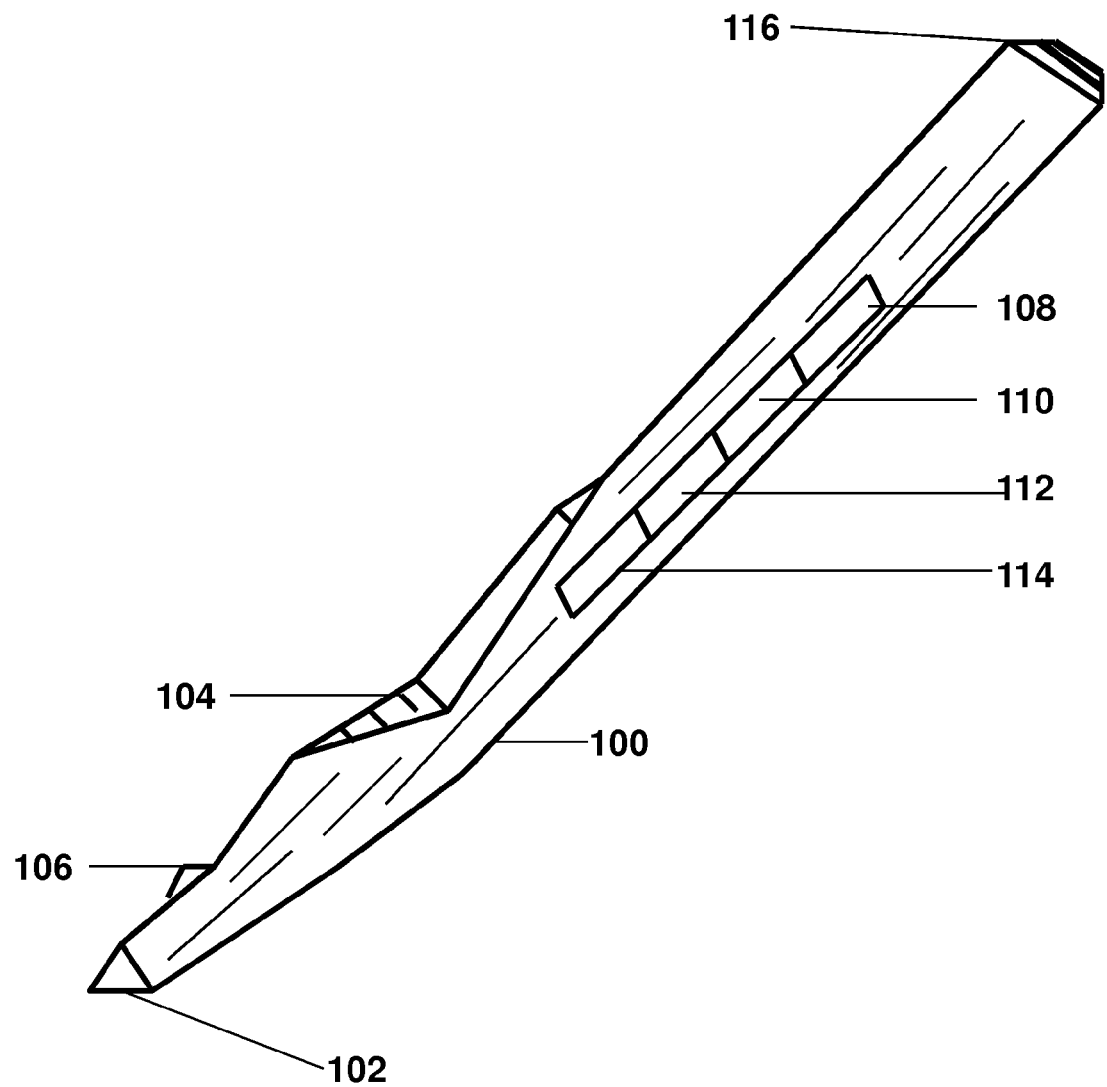
FIG. 1 is a smart pen device of the present invention with touch sensitivity capability.

The present invention incorporates computing instruments such as a stylus or smart pen to interface and input commands to a computer screen, mobile device or graphics tablet. With these touch screen devices, a user places the instrument on the surface of the screen to draw or make selections by tapping the stylus on the screen. The present invention expands the functionality of this interface device such that it plays a role in authenticating user and granting access to the user to user a specific computing device.

The system of the present invention shows a smart pen type device 100. The smart pen is used to interact with the touch screen of the smart phone, tablet computer or other computing devices. This smart pen device has a touch sensor 102 at the tip. This sensor contacts the surface of the screen of the computing device and records the amount of time between the time the user activates the pen 100 and the user activates the touch sensor 102 on the tip of the smart pen. The smart pen device of the present invention has an integrated finger print reader 104 located where normally a person would rest his or her index finger. Alternatively positions for other fingers like the thumb can be chosen. A user activates the smart pen when the user holds the smart pen device similar to holding any conventional writing instrument. Activation occurs when a user's finger contacts and rests on the finger print reader 104. A distance sensor 106 can be positioned at various locations on the smart pen 100. This distance sensor detects the approximate distance that the smart pen is from the computing at any time during the activation of the smart pen and the connection of the smart pen to a specific computing device. The smart pen 100 of the present invention can have other components which include central processing unit (CPU) 108, a memory component 110, a Bluetooth component 112 for facilitating communications between the smart pen and the computing device, and a GPS component 114. Depending on the application, the user may not use of some the smart pen device 100. The smart pen 100 also has a connector device 116 that can serve for example as a power charger or cable connector.

Figure 2:
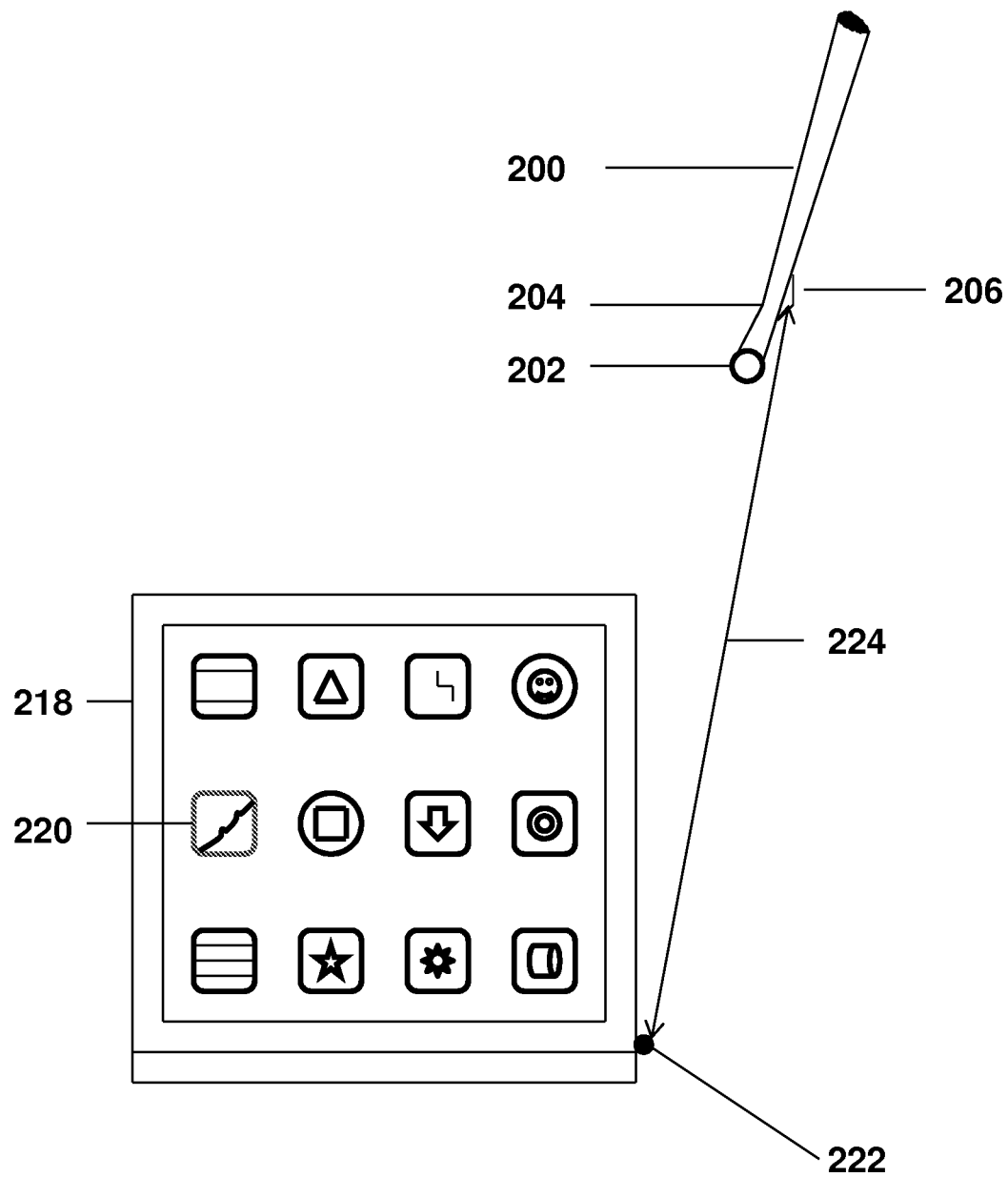
FIG. 2 is a view of a computing configuration in which the system of the present invention is implemented.

FIG. 2 is a configuration of components in the implementation of the system of the present invention. Shown is the smart pen 200, with the touch sensor 202, finger print reader 204 and the distance sensor 206. The smart pen can be connected to the device with a wire or it can be wireless (e.g. blue tooth). If it is wireless it can be used on any device equipped with the matching Smart Pen driver software. The smart pen 200 is used to interface with the computing device 218. This computing device can be any type of device such as tablet, laptop computer or smart phone device. The screen 220 on the computing device contains several icons that identify specific applications that a user can access or implement. A sensor 222 attached to the computing device is used to establish communications with the computing device. In addition, the sensor 222 along with the distance sensor 206 of the smart pen device can be used to calculate the distance between the computing device and the smart pen device.

As mentioned, the present invention provides for the enhancement of security for a computing using continuous user contact with the smart pen in order to maintained established user access with a computing device. In operation, when the device receives a touch input (and there was no connection to the Smart Pen), the device sends a connection request to the smart pen. The connection request can include information such as the device ID, pervious session data if available, etc. If the Smart Pen receives this request within a configurable amount of time (millisecond range) after the touch sensor was activated then the smart pen determines that it was used on the device (and not on some other surface) and sends the data with the finger print information to the device. If the pen does not receive the request in the amount of time allotted then the connection is not established. The device security software matches the finger print data with any registered users, either locally or by connecting to a secure server and authenticates the user. After the user is authenticated he/she can use the Smart Pen to navigate the screen of the computing device.

During the use of the smart pen in the present invention, if the user puts down the smart pen or in any way ceases to maintain continuous contact with the smart pen, the screen of the computing device 220 will become dim or obscured with an image or screen saver. In addition, if the user leaves the proximity of the computing device with the pen (the connection over blue tooth is lost for example), the computing device will also become dim.

After the computing screen becomes dim or disconnects completely from the smart pen and user, the connection from the Smart Pen to the device is reestablish when: a) the same user picks up the pen again (or a different one) and touches the screen (then the user is re-authenticated and continues where he/she left off); or b) another user uses a secure pen and touches the devices (then the new user is authenticated and former user is logged off and the new user is logged in). If no authorized user is recognized then the device remains locked.

Figure 3:
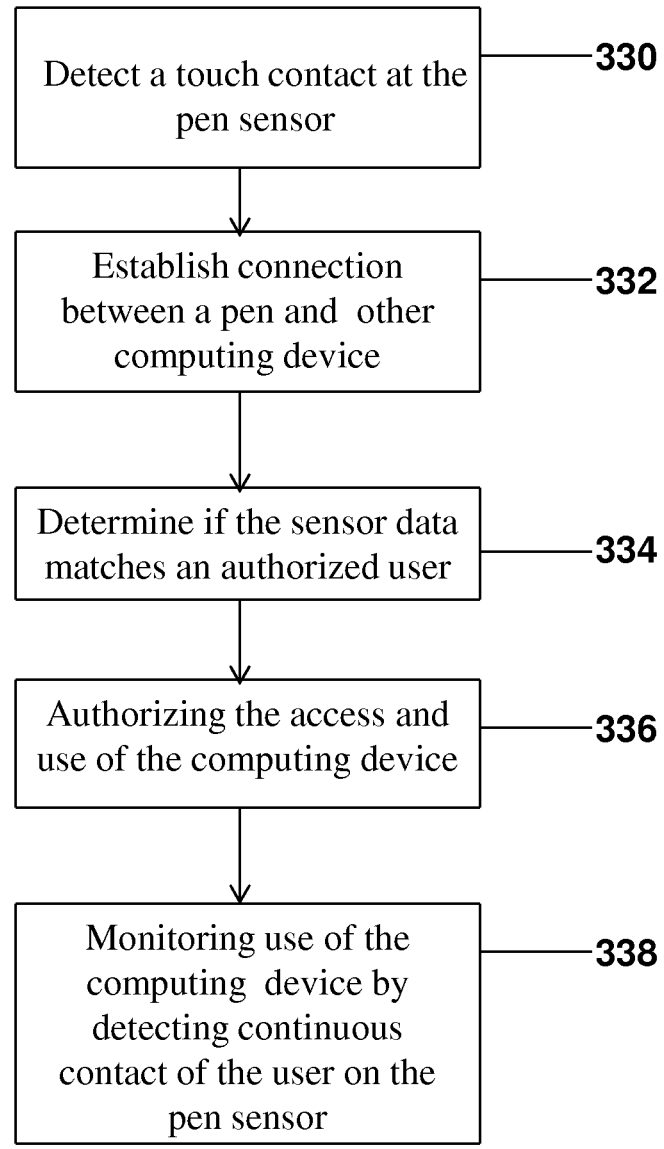
FIG. 3 is a flow diagram of the basic steps in the implementation of the method of the present invention.

FIG. 3 is a flow diagram of the basic steps in the implementation of the method of the present invention. In this method, a connection is established between the computing device and the smart pen device held by the user. Step 330 detects a touch at the computing device by the smart pen held by a user. In step 332, an initial communication is established between the computing device that is used and the smart pen that the user will use to input commands to the computing device. This communication process can be similar to current procedures that occur when a smart phone communicates with an earpiece of a user. There can be an index of devices (smart pens and computing devices) such that when a device makes a communication request, an initialization process begins between these devices. After the establishment of the communication between the devices, step 334 authenticates the user attempting to access computing device via the smart pen device. In this step, the smart pen identifies the user via the user by the user's fingerprint. The fingerprint reader identifies the user's fingerprint. The identified fingerprint is compared to a list of fingerprints for users authorized to use the computing device for which access is attempted. In step 336, if there is a match between the identified fingerprint and a fingerprint in the list of users authorized to use the particular computing device, then the user is granted access to the computing device. The user begins to access and use to the computer device. Step 338 begins monitoring of the use of the computing device by detecting continuous contact of the user with the smart pen.

Figure 4:
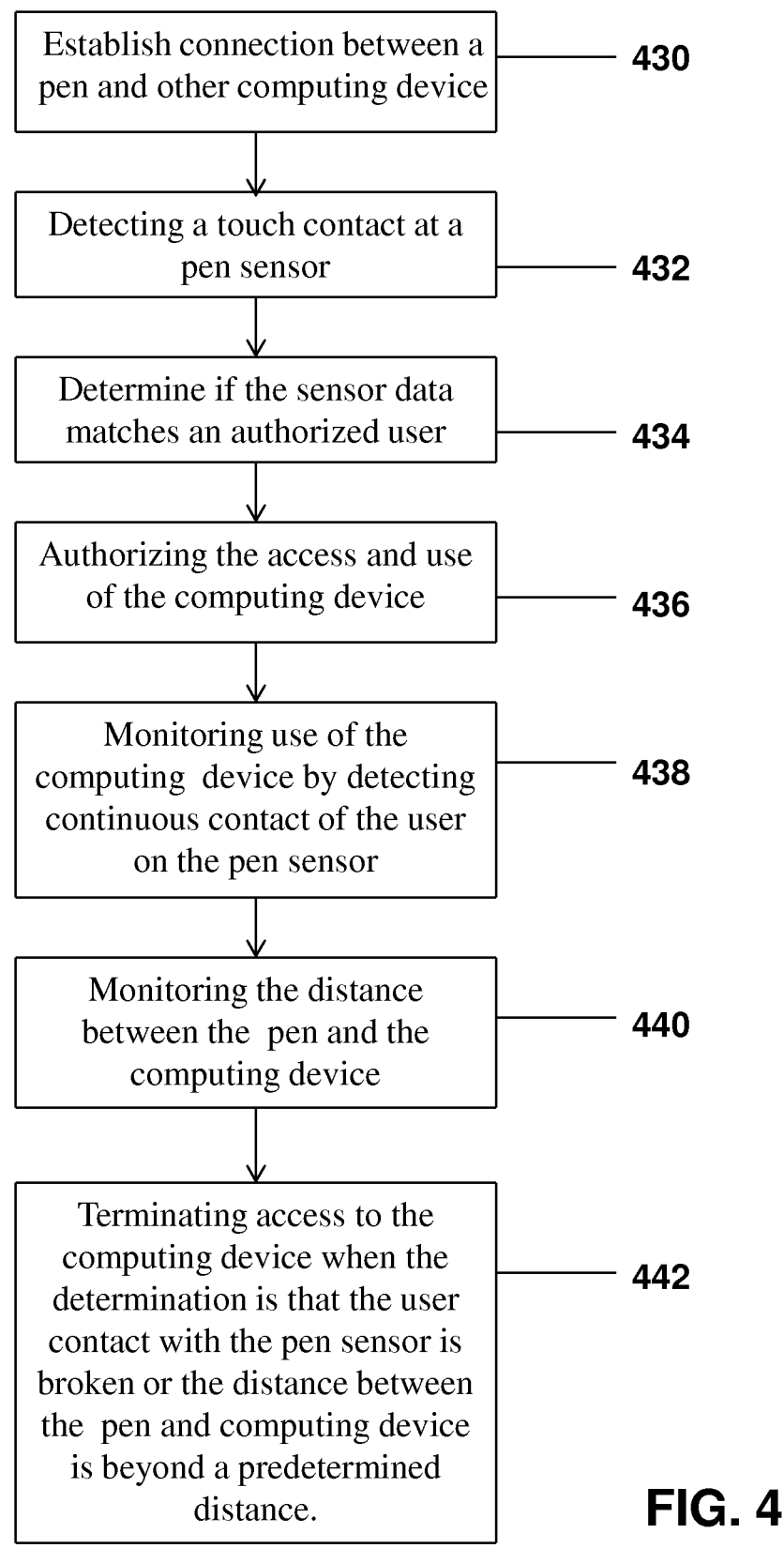
FIG. 4 is a detailed flow diagram of the steps in the implementation of the method of the present invention.

As mentioned, in the present invention, the objective is to provide enhanced security of a computing device such that no one other than the user can gain access to the device while the authorized user has access to it. Security is maintained by ensuring that the device remains attended by the user having access to it. A security breech occurs when the computing device is left unattended. This objective is achieved by ensuring that the user of the computing device remains in close proximity to the computing device. By incorporating inaction with the computing device via a smart pen, the user has to have a form of physical contact with the computing device in order to use the device. Another aspect of maintaining device security to ensure that the user of the device remains in close proximity to the computing device is to monitor the physical distance of the user from the device. The user having contact with the smart pen does not completely ensure that the user is in close proximity to the computing device. For example, the user could walk away from the computing device while holding the smart pen. Since the user is holding the smart pen, continuous contact is maintained. One solution could be to physically tether the smart pen to the computing device. However, this approach may create other limitations. Another alternative is to have a distance sensor on the smart pen that can detect when the smart pen has exceeded a defined threshold distance from the computing device. The exceeding of this threshold distance can be an indicator that the user may have walked away from the computing device. FIG. 4 is a detailed flow diagram of the steps in the implementation of the method of the present invention that accounts for the physical distance of the authorized user when the user is holding the smart pen. This method continues the process described in FIG. 3. In this process, steps 430, 432, 434, 436 and 438 are the same steps as steps 330, 332, 334, 336 and 338 respectively in FIG. 3. In this embodiment, step 440 monitors the distance between the smart pen and the computing device. A distance sensor on the smart pen can communicate its approximate distance from the computing device. The GPS feature of the smart pen could also have function in determining the distance of the smart pen from the computing device. The computing device can have a threshold distance established such that if the distance of the smart pen from the computing device exceeds this threshold distance, an event is triggered. In this process, step 442 would also interrupt access to the computing device until the smart pen was back within the established threshold distance of the computing device. Step 442 would interrupt access to the computing device if either continuous contact between the user and smart pen is broken or the smart pen has exceeded the established threshold distance from the computing device. A third parameter that could cause an interrupt is a lack of user activity. If the session continues without any type of contact or movement of the smart pen an inactivity trigger could be initiated in the same manner as the discontinuous contact and distance triggers.

Figure 5:
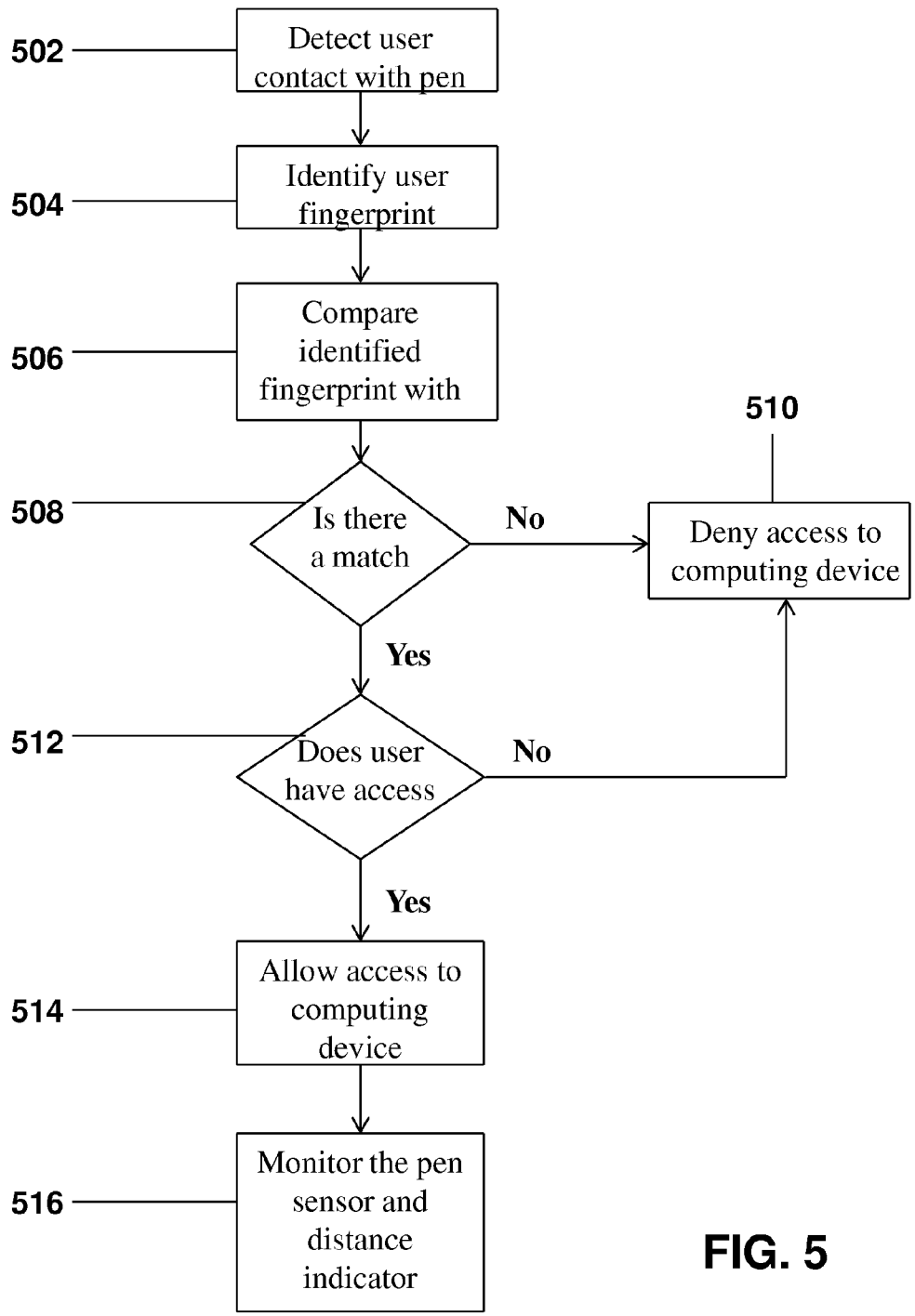
FIG. 5 is a flow diagram of the steps in the implementation of the user access method of the present invention using a smart pen device in the access process.

FIG. 5 is a flow diagram of the steps in the implementation of the user access procedure of the present invention using a smart pen device in the access process. As mentioned, in step 502, the fingerprint reader of the smart pen detects user contact. The next step 504 is to read and identify the user's fingerprint. Step 506 compares the identified fingerprint with fingerprints stored in an index. This index contains fingerprints of approved users for a particular device. Step 508 determines if there is a match between the identified fingerprint and a fingerprint in the user index. If there is no match, the process moves to step 510 which denies this user's attempt to access the particular computing device. In step 508, if there is a match between the identified fingerprint and a fingerprint in the user index, step 512 will determine if this particular user has the authorization to access to this particular computing device. This step 512 can be an optional step and its necessity can depend on how the access information is arranged. If there is a system with multiple users and some users only have access to some computing devices, then step 512 is more applicable. If the index is strictly device specific, then step 512 may not be needed. If the user fingerprint matches a fingerprint in the index and the user has access, then step 514 allows this user access to the computing device. Step 516 then begins to monitor the contact between the smart pen and the user and the distance between the smart pen and the computing device.

Figure 6:
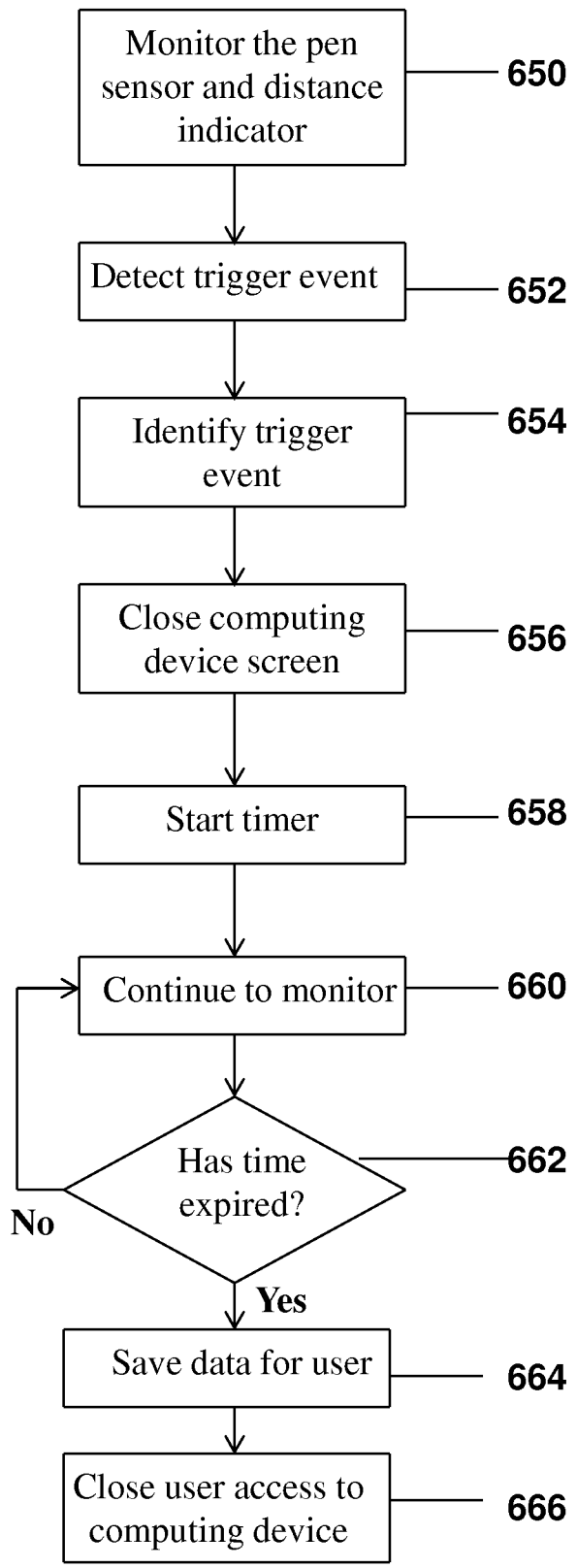
FIG. 6 is a flow diagram of the steps in the implementation of the monitoring process in the implementation of the method of the present invention.

After the user has established access with the computing device, a monitoring process continuously monitors the user's contact with the smart pen and the distance between the smart pen and computing device. FIG. 6 is a flow diagram of the monitoring process in the present invention. As mentioned, once the user establishes access to the computing device, step 650 begins to monitor the process. Step 652 detects an event. For purposes of this invention, the event could be a discontinuation of the contact of the user with the smart pen device. Another event could be the smart pen moving to a distance from the computing device that exceeds an established threshold distance between the smart pen and computing device. Step 654 identifies the particular trigger event. This step 654 can be optional and will depend on the system configuration. In some cases, events other than a discontinuance of contact with the smart pen or an exceeding of the threshold distance may trigger events. In other systems, only the mentioned events can cause a trigger. The trigger event indicates a breach of the computing device. This breach means that an accessible computing device has been left unattended. At this point, to secure the device, step 656 closes visual access to the computing device screen. When this access close occurs, the computer screen can become dark, or some form of screen saver or screen image can appear to hide the screen contacts. While the computer is unattended, no one can access the device or view the screen contents.

Step 658 starts a timer. Many times, during the use of a computing device, a user may briefly walk away from the device for various reasons. In addition, with the present invention, the user may put down the smart pen device. Although the screen will still go dark, it is undesirable to be required to re-establish user access for every detected event. Therefore, for brief disruptions (discontinuance of the smart pen contact or exceeding the distance threshold), visual access to the computer screen content is re-established by re-contact with the smart pen or by coming back with the threshold distance of the computing device. The amount time that constitutes a brief disruption will be a predetermined time. Once the timer is started in step 658, the monitoring process can continue in step 660 and the timer is also monitored. Step 662 determines if the timer has expired. If the timer has not expired, the monitoring step 660 continues. If during this time, the user re-establishes the access connection via touching the smart pen or the user comes back inside the threshold distance, the computer screen is restored and the process moves back to step 650. If the timer expires and there is no re-establishment of use by the user, step 664 can save the work done by this particular user during this access session and close the user access to the computing device in step 666. If user access is closed, this user will have to establish a new connection with the computing device. This invention attempts to secure a computing device when the device is left active and can allow unobstructed access to the computing device and information of another user.

Figure 7:
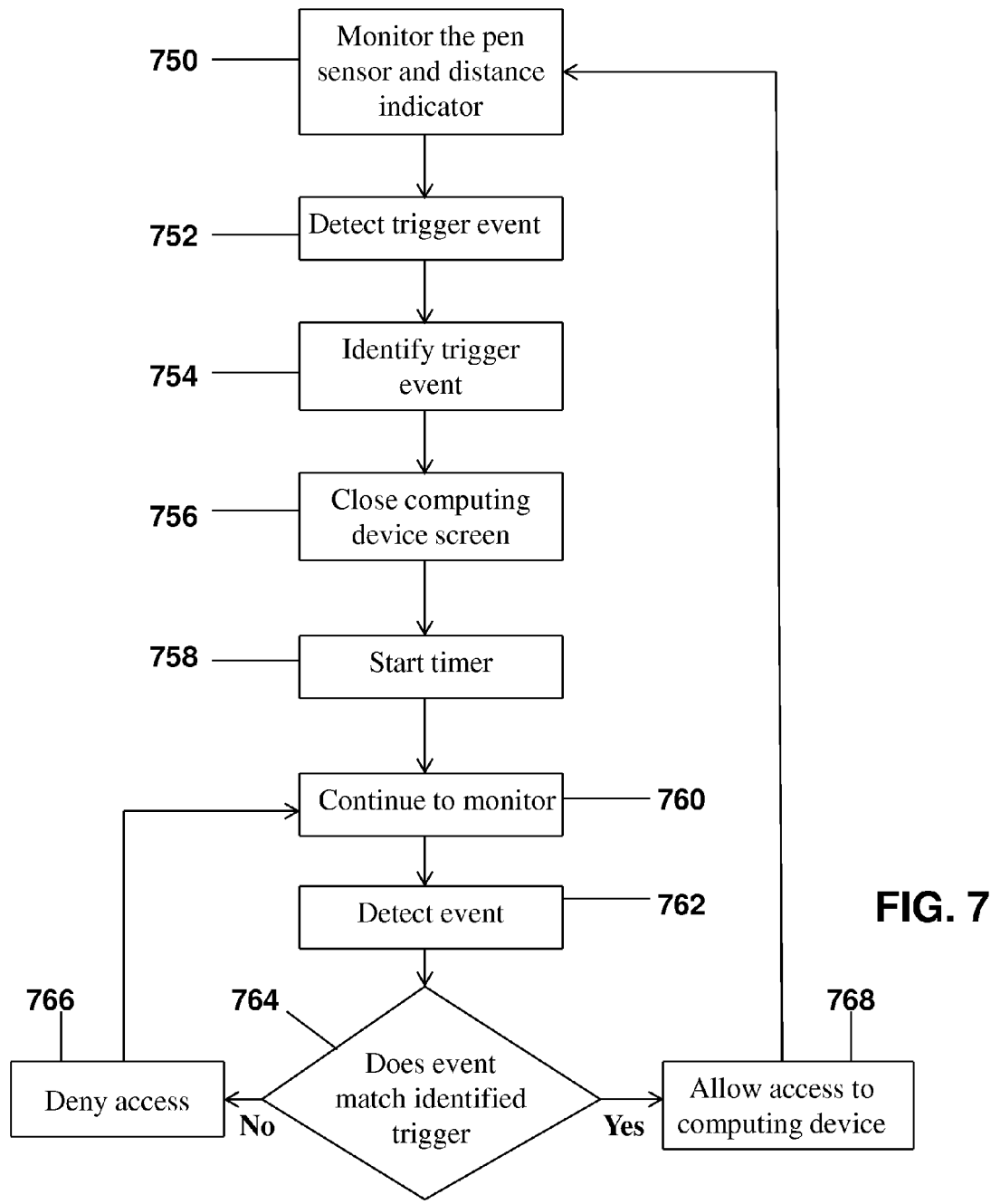
FIG. 7 is a flow diagram of the steps in the implementation of an alternate embodiment of the monitoring process of the method of the present invention.

FIG. 7 is a flow diagram of the steps in the implementation of an alternate embodiment of the monitoring process described in FIG. 6. Steps 750, 752, 754, 756, 758 and 760 are the corresponding steps to 650, 652, 654, 656, 658 and 660 of FIG. 6. Steps 758 and 760 occur when event occurs that indicates the user has left the computing device unattended. While the computing device is unattended and before the timer expires, step 762 can detect another event. However, this event may be a different user picking up the smart pen. If this occurs, step 762 will detect it as an event. Since the timer has not expired, one respond to this event would be to resume the session under the authorized user. However, since this user is not the authorized user of this session, resuming the session would be a security breach and would compromise the computing device. Step 764 evaluates the detected event and determines the whether the trigger event is from the authorized user who has current access to that computing device or if the trigger is from another user. If the determination is that the trigger is from the user having current access to the computing device, then the process moves back to step 750. The user has resumed use of the computing device. If the trigger in step 764 is not from the user having current access to the computing device, step 766 denies access to the computing device. Someone other than the current user triggering an event indicates unauthorized use attempt and a potential security breach of the computing device. Since the time has not expired, one option is to deny access to the computing device and return to the monitoring step 760. An alternate response is to close the session. The determination process in step 764 could be to use the fingerprint reader to determine the identity of the user now holding the smart pen. When the determination is that the user is not the initiator of the session, then the access is denied.

It is important to note that while the present invention has been described in the context of a fully functioning computer device security system. Those skilled in the art will appreciate that the processes of the present invention are capable of being distributed in the form of instructions in a computer readable storage medium and a variety of other forms, regardless of the particular type of medium used to carry out the distribution.

I claim:

1. A method for restricting access to a security sensitive device by continuously authenticating a current user of the security sensitive device comprising:

detecting a touch at a smart pen device;

detecting an access attempt at a computing device via touch screen by the smart pen by initiating a touch input to a computing device from a smart pen device;

receiving a touch input at the computing device;

sending a connection request to the smart pen device that initiated the touch input;

determining if the smart pen received the connection request in a predetermined amount of time; and when the smart pen did receive the connection in the predetermined amount of time, sending fingerprint data of the current user to the computing device;

authorizing access of the computing device;

monitoring user access of the computing device;

detecting a security event during the access of the computing device;

closing access to the computing device;

starting a timer that keeps the time from the start of the detected security event and recording the time since the detection of the security event;

determining if the recorded time has exceeded a predetermined threshold time; and terminating user access to the computing device when the determination is that the recorded time has exceeded the threshold time.

2. The method as described in claim 1 wherein said authorizing access further comprises:

identifying the current user fingerprint;

comparing the identified current user fingerprint to an index of fingerprints of users authorized to access the computing device; and allowing current user access to the computing device when there is a match of the current user fingerprint and a fingerprint in the index of users authorized to access the computing device.

3. The method as described in claim 1 wherein said monitoring user access further comprises continuously detecting user contact with the smart pen device.

4. The method as described in claim 1 wherein said monitoring user access further comprises continuously monitoring distance between the smart pen device and the computing device and issuing an event trigger when the detected distance exceeds a predetermined threshold distance.

5. The method as described in claim 1 wherein said monitoring user access further comprises continuously detecting current user activity the computing device.

6. The method as described in claim 1 wherein said closing visual access to the computing device further comprises saving data from a current screen of the computing device for that user in a temporary storage location.

7. The method as described in claim 1 wherein a security event occurs when a user:

releases the Smart Pen (removes finger from reader) for a configurable amount of time, leaves the proximity of the device with the pen; or does not touch the device for a configurable amount of time while holding the pen.

8. A method for restricting access to a security sensitive device by continuously authenticating a current user of the security sensitive device comprising:

detecting a touch of a user at a smart pen device;

detecting an access attempt at a computing device via touch screen by the smart pen by initiating a touch input to a computing device from a smart pen device;

receiving a touch input at the computing device;

sending a connection request to the smart pen device that initiated the touch input;

determining if the smart pen received the connection request in a predetermined amount of time; and when the smart pen did receive the connection in the predetermined amount of time, sending fingerprint data of the current user to the computing device;

authorizing access of the computing device;

monitoring user access of the computing device;

detecting a security event during the access of the computing device;

closing access to the computing device;

starting a timer that keeps the time from the start of the detected security event and recording the time since the detection of the security event;

determining if the recorded time has exceeded a predetermined threshold time; and reopening the computing device screen for visual access to a current user when the determination is that the recorded time has not exceeded the threshold time.

9. The method for restricting access to a security sensitive device as described in claim 8 wherein reopening visual access to the computing screen occurs when the same current user re-establishes contact with the smart pen again.

\* \* \* \* \*